United States Patent [19]
Cohen et al.

[11] Patent Number: 5,782,973
[45] Date of Patent: Jul. 21, 1998

[54] CEMENT DUST RECOVERY SYSTEM

[75] Inventors: Sidney M. Cohen, Allentown; Michael E. Prokesch, Zion Hill, both of Pa.

[73] Assignee: Fuller Company, Bethlehem, Pa.

[21] Appl. No.: 841,056

[22] Filed: Apr. 29, 1997

[51] Int. Cl.$^6$ .................. C04B 7/45; C04B 7/60; F27B 15/00

[52] U.S. Cl. .................. 106/744; 106/751; 106/752; 106/753; 106/754; 106/756; 432/15; 432/16

[58] Field of Search .................. 106/744, 751, 106/752, 753, 754, 756; 432/15, 16

[56] References Cited

U.S. PATENT DOCUMENTS

| | | | |
|---|---|---|---|
| 4,001,030 | 1/1977 | Watson et al. | 106/752 |
| 4,031,184 | 6/1977 | McCord | 106/751 |
| 4,161,411 | 7/1979 | Sell et al. | 106/751 |
| 4,173,487 | 11/1979 | Cohen | 106/751 |
| 4,220,476 | 9/1980 | Touborg | 106/751 |
| 4,249,952 | 2/1981 | Davis, Jr. et al. | 106/751 |
| 4,404,032 | 9/1983 | Nudelman et al. | 106/755 |
| 4,568,276 | 2/1986 | Fujisawa et al. | 106/744 |
| 4,584,022 | 4/1986 | Cohen | 106/744 |
| 4,780,143 | 10/1988 | Roe | 106/751 |
| 4,897,218 | 1/1990 | Roe | 106/751 |

FOREIGN PATENT DOCUMENTS

| | | | |
|---|---|---|---|
| 153048 | 9/1985 | European Pat. Off. | 106/751 |
| 3400158 | 7/1985 | Germany | 106/751 |
| 234855 | 4/1986 | Germany | 106/751 |
| 393232 | 8/1973 | U.S.S.R. | 106/751 |
| 595587 | 12/1947 | United Kingdom | 106/751 |

*Primary Examiner*—Anthony Green
*Attorney, Agent, or Firm*—Daniel DeJoseph

[57] ABSTRACT

A process of treating dust from a cement manufacturing operation. The process comprises adding carbon bearing material to the dust catch from a cement manufacturing operation to form a mixture, which is formed into nodules and sizing the nodules to obtain a feed material having a selected size range. The nodules are directed as feed material to a fluidized bed which is maintained by passing air for combustion upwardly through a bed of material. The material is thermal processed within the fluidized bed in a reducing atmosphere by supplying fuel for combustion in the fluidized bed to maintain temperatures sufficient to volatilize alkali and sulfur compounds in the feed material and produce a product having an increased concentration of cement forming compounds and reduced alkali and sulfur compounds as compared to the feed material. The reduced clinker is then re-oxidized to minimize/reverse adverse color and mineralogy.

14 Claims, 1 Drawing Sheet

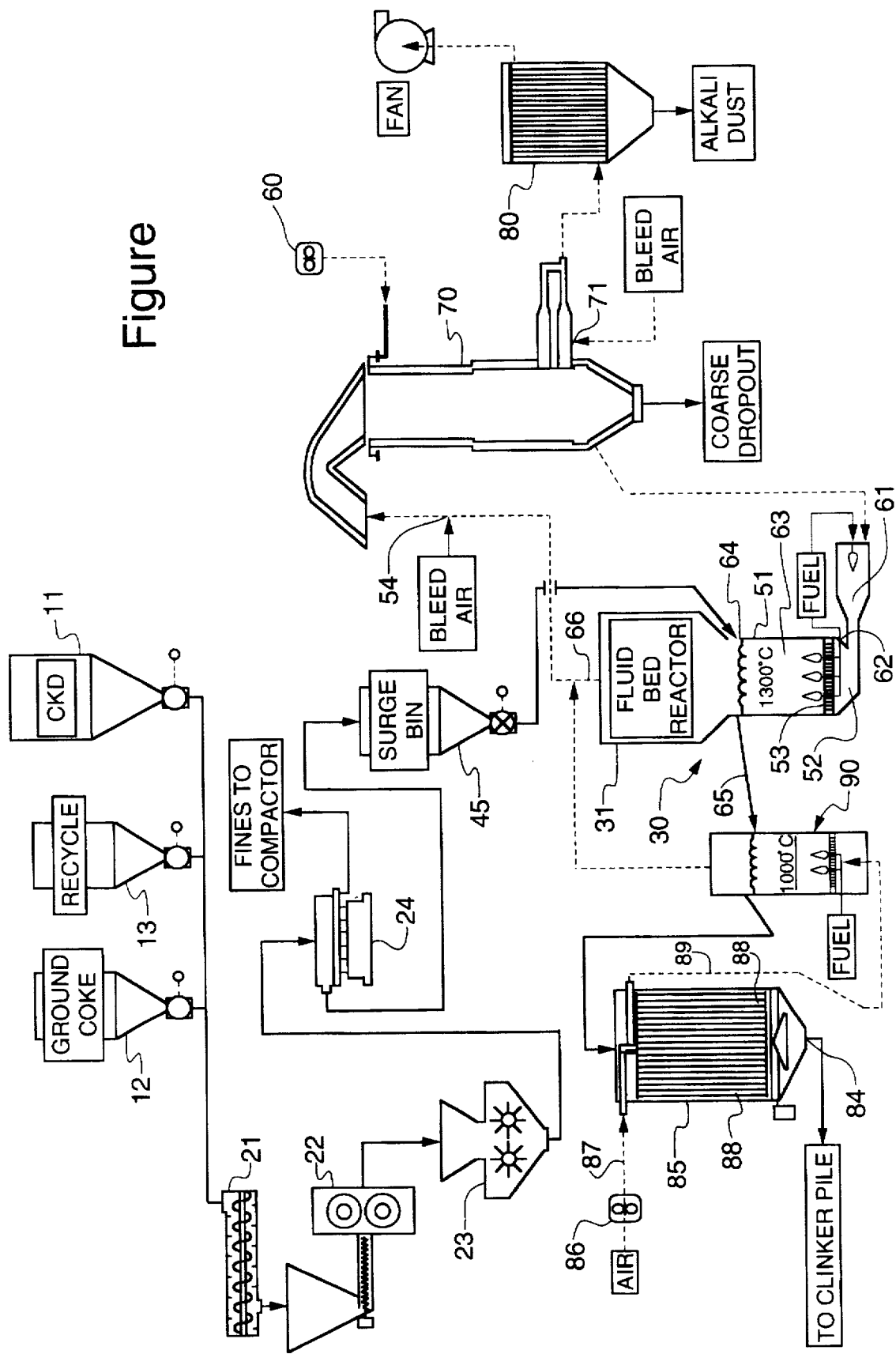
Figure

CEMENT DUST RECOVERY SYSTEM

BACKGROUND OF THE INVENTION

U.S. Pat. No. 4,584,022 teaches a process of treating the dust catch from a cement manufacturing operation to produce either cement clinker or an intermediate product suitable for feed to a conventional cement clinker production facility. The process includes a feed preparation stage where dust catch, coal or coke and a binder such as cement are combined. Additives to correct the material chemistry may also be added. This mixture is formed into nodules which are dried and then sized to form a feed material. The feed material is processed at or near cement clinkering temperatures in a fluidized bed reactor to volatilize alkali and sulfur compounds and produce the intermediate product or cement clinker.

This prior art fluid bed cement kiln dust ("CKD") recovery system has demonstrated typical volatilization rates on the order of 90% $K_2O$; 70% $Na_2O$ and 90% $SO_3$ during pilot scale studies. In most cases, the clinker product is characterized by a total alkali level <0.6% (sodium equivalent), <1% freelime and <1% $SO_3$; a level sufficiently low to allow for gypsum addition to the final ground cement to control setting times. This clinker is produced utilizing a fluid bed process gas containing approximately 2.0% $O_2$ at a maximum temperature of 1290°–1300° C.

The volatilization rates listed above indicate that a low alkali (<0.6% sodium equivalent) cement clinker may be produced if the total alkali content of the feed material is limited to approximately 6% total alkali as $Na_2O$ (as determined on a loss free basis). While many CKD samples contain <6% total alkali as $Na_2O$, over the years CKD chemistry has been altered and the dust generally contains increased levels of alkali ($K_2O+Na_2O$) and sulfur ($SO_3$).

For example, CKD generated from bypass systems and modified straight kilns demonstrate alkali levels in the range of 6 to 15% total alkali as $Na_2O$ and $SO_3$. The $SO_3$ level in the CKD is usually higher than the alkali content due to the presence of $CaSO_4$. Therefore, a volatilization rate of approximately 90% will yield a clinker with total alkali and sulfur levels >1% when processing a feed containing total alkali and sulfur levels of 15%.

In addition, the alkali forms found in many samples may offer an increased resistance to volatilization during high-temperature processing in an oxidizing atmosphere. Therefore, an improved CKD recovery system is needed to produce a good quality, low alkali cement clinker from CKD samples containing high alkali levels or alkali forms resistant to volatilization, and such is one object of the present invention.

SUMMARY OF THE INVENTION

The main components of the system of the present invention Cement Plant CKD Recovery System design include the material preparation/sizing system, fluid bed calciner, and reoxidation unit.

The CKD recovery process requires the formation of from about ¼"× about 16 mesh to about 4× about 20 mesh nodules from the kiln dust to make them suitable for fluid bed processing. This nodule formation may be performed by pelletizing, compaction/granulation or extrusion/granulation circuits. Pelletizing minimizes crushing requirements, while compaction/granulation typically eliminates the need for a water addition and subsequent drying. Compaction/granulation offers the potential to reduce the process heat consumption by up to 100 kcal/kg by retaining the freelime present in the CKD. Extruded pellets require drying prior to extensive crushing/sizing.

Feed material is then supplied to the fluid bed reactor where it is processed at cement clinkering temperature to produce a product. Volatilized alkali and sulfur compounds are precipitated out of exhaust gases from the fluidized bed by the addition of bleed air.

It is a primary feature of the present system that the fluid bed reaction is operated under a mild reducing atmosphere. It has been discovered that under such conditions the volatilization of alkali and sulfur will be increased to approximately 95–98%. These levels of volatilization permit the production of a low alkali cement clinker from CKD samples containing greater than 6% total alkali as $Na_2O$.

BRIEF DESCRIPTION OF THE DRAWING

The invention will be described in connection with the annexed drawing in which the Figure is a diagrammatic view of apparatus for carrying out the process of the present invention.

DESCRIPTION OF THE PREFERRED EMBODIMENT

Prior to agglomeration, the CKD from bin 11 is blended with a quantity of coal and/or coke from bin 12 in an amount sufficient to bring the carbon content of the pelletized feed material to between about 8% to about 15% carbon content and to supply up to 90% of the process fuel requirement. In addition to heat contribution, combustion of this solid fuel generates localized reducing conditions within the pellet to improve alkali volatilization. If a modification of the potential cement compounds in the feed is required, limestone or silica additions are made during the preparation process. In most cases CKD is found to be deficient in calcium, and requires a limestone addition to obtain potential $C_3S$ levels in the range of 50–60%.

The apparatus may include additional bins such as that indicated at 13 for recycled material and other bins (not shown) for additives, if chemical adjustment is considered necessary by the operator.

The Figure sets forth one embodiment of a method and apparatus for forming CKD—containing nodules. Depicted is a compaction/granulation circuit which utilizes a high-speed conditioner/mixer 21 to blend CKD, coal/coke and additives. Following roll compaction in compactor 22, the cake or briquettes are granulated in granulator 23 and then directed to screen 24 to produce approximately 4×20 mesh granules, with −20 mesh fines recycled back to the compaction unit. A drying circuit should not be required as the only moisture present in the 4×20 mesh pellets is that which is present in the mix components prior to blending. This permits a partial or full recovery of the freelime present in the CKD to reduce the thermal loading in fluid bed reactor 30.

This compaction process has been found to be very cost effective in terms of initial capital investment and labor requirements during operation. Fluid bed testing on CKD pellets formed by the compaction process has proved to be effective in resisting excessive degradation in the reactor.

Alternate methods of preparing the nodules are contemplated. For example, the blended CKD mixture may be fed from conditioner 21 to an extruder to generate approximately ½–1" diameter ×1–2" long wet extrusions. These extrusions require drying, followed by crushing and sizing.

While able to produce a suitable feed pellet for use in the present process, this process is currently the most energy intensive approach.

In yet another method, CKD plus coal/coke and additives may be metered to a pug mill for mixing of the solid materials with approximately 10–15% water. This water is required to react any freelime present. The resulting wet CKD blend is then formed into small, uniform pellets in a pin-type pelletizer and subsequently directed to a rotating disc to densify, harden and control the pellet sizing. The pelletized material is screened to approximately 4×20 mesh and conveyed to a dryer (rotary or fluidized bed dryer) supplied with hot air from the clinker cooler. Exhaust gases from the dryer are taken to a high efficiency dust collector, and the dust collected is recycled back to the pelletizing system along with undersized pellets from screening. Oversized pellets from screening are crushed, rescreened and then dried. This embodiment of the feed preparation process generates a dry 4×20 mesh pellet (<1% $H_2O$) that is ideal for fluidized bed processing. It has been found that some CKD samples formed via this process will not pelletize properly without a binder. In these cases, approximately 2% to 5% by weight Portland cement is added as a binder to increase pellet strength and reduce particle degradation in the drying and calcining circuits. A curing period of several hours in a surge bin is required prior to drying of the pellets.

The nodules are conveyed from the feed preparation system to the main feed storage bin 45. This material is then metered from bin 45 to fluidized bed reactor 30 for thermal processing. The fluid bed reactor is divided into an upper thermal processing chamber 51 and a lower plenum 52 by means of a gas permeable refractory grid (air distribution plate) 53 containing a number of orifice holes (not shown). The size and quantity of these openings are designed based on particle sizing and calculated grid pressure drop requirements. A properly designed grid plate generates a pressure drop equal to approximately one half of the bed to ensure even air distribution. The volume of pressurized air supplied to plenum 52 is of an amount capable of generating a superficial fluidization velocity in the reaction zone in the range of six to twelve feet per second. Such a fluidization velocity maintains the bed material in a highly active fluidized state above air distribution plate 53. Inadequate velocities result in reduced capacity and inter-particular adhesion, while extreme velocities lead to rapid particle degradation. The fuel present in the feed pellets is augmented by direct fuel injection (natural gas or oil) into the fluid bed. This fuel represents the additional amount required by the process after combustion of the feed-bearing carbon.

As indicated, a reducing atmosphere is maintained in the main combustion/reaction area of the fluid bed reactor 30. This desired reducing atmosphere is achieved by utilizing an increased heat load in the system, and will be measured by the percent CO detected in the freeboard area 31 of the fluid bed reactor 30. The feed rate and fuel delivery rate to the fluid bed reactor 30 are maintained in an amount sufficient to maintain a mild reduction atmosphere in the fluid bed reactor 30; which will be determined by there being a Co rate of from about 1% to about 2% as measured in freeboard area 31. In order to reduce the CO content a small quantity of air is bled into the freeboard area 31 or in the off gas stream, such as at area 54, to react with the CO prior to its entering heat exchanger 70.

A positive displacement blower 60 supplies the pressurized air to plenum 52. This air, before entering plenum 52 passes through an auxiliary air heater 61 required to bring reactor 30 up to the fuel ignition temperature (500° C.+). After fluid bed 63 combustion is self-sustaining, fuel flow to the air heater 61 is discontinued. Gas/oil injection is then started at inlet 62 to supplement coal combustion and to control fluid bed 63 temperature to obtain clinkering reactions; this temperature is typically in the range of 2300° F. to about 2450° F., and preferably about 2320° to about 2370° F.

The feed pellets are gravity fed into the top of fluidized bed 63 via inlet 64. The turbulent mixing action of the bed pulls the fresh feed down into the bed where combustion of the coal occurs almost instantaneously. This turbulence also ensures excellent gas/solid and solid/solid heat transfer. The volume of CKD feed entering the reactor displaces a volume equal to the clinker (product) overflow from the reactor at outlet 65 to the oxidation unit 90. The average material retention time in fluidized bed 63 may be in the order of about one hour or less to about two hours, depending on the chemistry of the feed nodules, and in any event will be less than would be required under identical conditions but not employing a reducing atmosphere. Unlike a rotary system, the particles in the fluid bed are exposed to the full clinkering temperature for the majority of their residence time. In addition, because the process is carried out in a reducing atmosphere and also due to the lack of a high-intensity flame or combustion zone, the rate of NOx formation will be significantly lower than in a rotary kiln system.

With fluid bed temperatures >1270° C., alkali compounds are volatilized and sulfur-bearing compounds decomposed. Characteristic volatilization/removal rates for the fluid bed process are 90% $K_2O$, 70% $Na_2O$, 90% $SO_3$, and 95% Cl. The reducing atmosphere in the fluid bed zone will improve the volatilization rates to >95%. These volatiles and gases are carried out of the reactor with the process off-gas stream through conduit 66. The design of fluid bed reactor 30 will prevent or lessen the contact between cool feed material and the hot, volatilized alkali compounds that would lead to alkali deposition on the particles, and thus generate a growing concentration of recirculated alkali volatiles.

As the process gas stream passes through the fluidized bed 63, it entrains a small percentage of the total feed input as fines generated in the bed due to pellet fracture and degradation; the amount depends on feed pellet strength. A majority of these particles will be collected mainly as fine clinker fallout from the heat exchange unit 70. This material has similar cement properties as the fluid bed overflow product, and can be recombined with the product flow stream without an adverse effect on the final cement clinker chemistry, or returned to the feed preparation system. Fines that remain entrained are collected at the gas filtration unit 80.

The cement clinker overflows from the fluid bed reactor 30 and enters an oxidation unit 90. This oxidation unit is maintained at a temperature greater than about 700° C., and preferably greater than about 1000° C., to oxidize the reduced clinker zones. The upper re-oxidation temperature will be depending more on process requirements. Obviously, higher temperatures will require expending additional fuel in the system.

The temperature of unit 90 is preferably maintained using the heat provided by the 1300° C. clinker discharging from the fluid bed reactor. Oxidation unit 90 may be of a fluid bed design (which is depicted in the Figure), a static bed, or may be incorporated as an upper high temperature zone in the product cooler. The volume of the unit is sized to provide a minimum clinker residence time of one hour.

Oxidation unit 90 is used to re-oxidize reduced areas in cement clinker and will minimize or eliminate any undesired clinker properties such as color, hydration etc. that may be a by-product of the reduction process.

The high-temperature air from oxidation unit 90 may be directed to the fluid bed plenum 52, or may be used elsewhere in the process for the purpose of drying or preheating. For example, in the Figure, the air from oxidation unit 90 is combined with the off gas from fluid bed reactor 30.

If a separate vessel is utilized for the purpose of clinker oxidation, the oxidized clinker from this vessel is discharged to a final cooling device. This cooling device may be of indirect, packed bed or fluidized bed design. The preheated air from this device is directed to oxidation unit 90. The cooled cement clinker is conveyed to a storage bin or grinding circuit.

The preferred cooler is an indirect gravity flow cooler 85 where the clinker is cooler by indirect heat exchange with ambient cooling air supplied from a source such as a blower 86 through conduit 87 to cooler tubes 88. Air is heated in the cooler and is discharged from a cooler through conduit 89. As indicated, air may be directed from cooler 85 to oxidation unit 60. Clinker product is discharged from the cooler 85 through an outlet 84.

The flow of clinker through cooler 85 may be aided by the use of a "live bottom" bin activator to promote uniform material flow down through the unit. The height of cooler 85 is designed to reduce clinker temperature to less then 150° F. in most cases. In cases where this cannot be achieved due to head room, a second cooler may be added to the system.

The process gas stream, containing products of combustion, volatilized alkali, $CO_2$, $SO_2$ and fines, exits the fluid bed reactor area and passes through a transitional section before entering the parallel flow heat exchanger unit at 1100–1200° C. The heat exchanger system serves to reduce the temperature of the off gas stream to condense the alkali volatiles, while improving process efficiency by preheating the fluidizing air (>500° C.) supplied to the fluid bed reactor 30.

The optional heat exchange system operates in parallel flow to obtain the maximum level of process gas temperature reduction in the uppermost section. This rapid temperature reduction is necessary to condense the alkali compounds present and reduce the likelihood of alkali formations in the direct transfer section. Concealment of the upper transfer pipes in a silicon carbide refractory around the perimeter of heat exchanger 70 maintains a hot face temperature sufficient to prevent alkali condensation and resulting deposition. The process gas stream then enters an in-line direct transfer section at a temperature at which the alkali attack on transfer materials is not a strong concern, and at which point the alkali compounds have begun to condense and solidify. The laminar flow that exists in this section minimized excessive gas/tube contact that would promote alkali deposit formation. The cross-sectional area of the heat exchanger is sized to reduce the process gas velocity and act as a fallout chamber for collection of a large percentage of coarse clinker fines entrained in the fluid bed process gas flow.

The gas stream emerging from heat exchanger 70 is quenched at point 71 with ambient air to below 350° C. At this temperature, alkali compounds are present in a full crystalline state, and no longer pose a potential buildup problem. This alkali material is in the form of a fine, white powder that is filtered from the process flow at the filtration system.

As indicated, it has been discovered that the present invention is effective when utilized on CKD samples that although containing less than 6% total alkali, such alkali are in forms, such as alkali sulfates, that are difficult to volatilize. It has been discovered that achieving a 90%+ alkali volatilization under such conditions, utilizing an oxidizing atmosphere and 1300° C. process temperature, will generally require about 2½–3 hours reaction time. However, the same level of volatilization can be obtained in about ½ to ¾ hours utilizing a mild reducing atmosphere.

It is intended that the foregoing be a description of a preferred embodiment, but that the invention be limited solely by that which is within the scope of the indented claims.

We claim:

1. A process of treating dust from a cement manufacturing operation comprising the steps of:

adding carbon bearing material to the dust catch from a cement manufacturing operation to form a mixture;

forming the mixture into nodules;

sizing the nodules to obtain a feed material having a selected size range;

establishing and maintaining within a vessel a fluidized bed of feed material by passing air for combustion upwardly through a bed of material;

thermal processing the material within the fluidized bed in a mild reducing atmosphere by supplying fuel for combustion in the fluidized bed to maintain temperatures sufficient to volatilize alkali and sulfur compounds in the feed material and produce a product having an increased concentration of cement forming compounds and reduced alkali and sulfur compounds as compared to the feed material, with said fuel for combustion and said feed material being added to the vessel in an amount at a rate sufficient to maintain a mild reducing atmosphere in the fluidized bed;

directing solid product which is discharged by displacement from the vessel to a oxidizing vessel in which said solid product is re-oxidized;

discharging combustion gas, entrained product and volatilized alkali and sulfur compounds from the vessel; and condensing the volatilized alkali and sulfur compounds.

2. A process according to claim 1 further comprising the step of adding bleed air to the discharged combustion gas to thereby reduce the amount of CO present in the discharge combustion gas.

3. A process according to claim 1 further comprising the step of preheating the air for combustion by indirect heat exchange with combustion gases discharged from the vessel.

4. A process according to claim 1 wherein the step of sizing the nodules includes compacting and granulating the nodules and screening the compacted and granulated nodules to obtain a feed material having a selected size range.

5. A process according to claim 1 wherein the nodules are formed by extruding the mixture.

6. A process according to claim 1 wherein air for combustion is passed through the bed of material at a rate in the range of 6 to 12 feet per second and the fluidized bed is maintained at a temperature between about 2300° and about 2450° F.

7. A process according to claim 1 wherein entrained product in the discharged combustion air is separated from the combustion air downstream from the vessel.

8. A process according to claim 1 wherein a cement binder is added to the dust in the range of up to about 5% by weight.

9. A process according to claim 1 wherein the carbon is added in an amount sufficient to realize an amount of carbon in the feed material in a range of from about 8% to 15 by weight.

10. A process according to claim 1 wherein the oxidation unit is maintained at a temperature greater than about 700° C.

11. A process according to claim 10 wherein the oxidation unit is maintained at a temperature greater than about 1000° C.

12. A process according to claim 1 wherein the oxidation unit is a fluid bed design.

13. A process according to claim 1 wherein further the solid product is cooled by an indirect gravity heat exchange with ambient cooling air.

14. A process of treating dust from a cement manufacturing operation comprising the steps of:

adding carbon bearing material to the dust catch from a cement manufacturing operation to form a mixture;

forming the mixture into nodules;

sizing the nodules to obtain a feed material having a selected size range;

establishing and maintaining within a vessel a fluidized bed of feed material by passing air for combustion upwardly through a bed of material;

thermal processing the material within the fluidized bed in a mild reducing atmosphere by supplying fuel for combustion in the fluidized bed to maintain temperatures sufficient to volatilize alkali and sulfur compounds in the feed material and produce a product having an increased concentration of cement forming compounds and reduced alkali and sulfur compounds as compared to the feed material, and directing the product which is discharged by displacement from the vessel to a oxidizing vessel in which said product is re-oxidized.

* * * * *